United States Patent
Jeon et al.

(10) Patent No.: US 9,290,136 B2
(45) Date of Patent: Mar. 22, 2016

(54) APPARATUS AND METHOD FOR PREVENTING LEAKAGE OF VEHICLE INFORMATION

(71) Applicant: ELECTRONICS AND TELECOMMUNICATIONS RESEARCH INSTITUTE, Daejeon (KP)

(72) Inventors: Sungho Jeon, Busan (KR); Jeong-Han Yun, Daejeon (KR); Woonyon Kim, Daejeon (KR); Jungtaek Seo, Daejeon (KR); Eung Ki Park, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 14/475,631

(22) Filed: Sep. 3, 2014

(65) Prior Publication Data

US 2015/0343967 A1 Dec. 3, 2015

(30) Foreign Application Priority Data

May 30, 2014 (KR) .................. 10-2014-0065716

(51) Int. Cl.
*B60R 16/023* (2006.01)
*H04L 29/06* (2006.01)
*H04W 12/12* (2009.01)
(Continued)

(52) U.S. Cl.
CPC ............ *B60R 16/023* (2013.01); *H04L 63/067* (2013.01); *H04L 63/0838* (2013.01); *H04L 63/1475* (2013.01); *H04L 63/1491* (2013.01); *H04L 67/12* (2013.01); *H04W 12/12* (2013.01); *B60R 25/30* (2013.01); *H04L 63/04* (2013.01); *H04L 2012/40215* (2013.01);

(Continued)

(58) Field of Classification Search
USPC .................. 713/100–194; 726/1–36
See application file for complete search history.

(56) References Cited

U.S. PATENT DOCUMENTS 5,661,807 A * 8/1997 Guski et al. ............ 713/159
6,983,381 B2 * 1/2006 Jerdonek ................ 726/5
(Continued)

FOREIGN PATENT DOCUMENTS

KR 10-0737385 B1 7/2007
KR 10-2010-0101805 A 9/2010
KR 10-2014-0002572 A 1/2014

*Primary Examiner* — Rami Khatib
*Assistant Examiner* — Timothy Nesley
(74) *Attorney, Agent, or Firm* — LRK Patent Law Firm

(57) ABSTRACT

An apparatus and method for preventing the leakage of vehicle information in a normal communication environment by inserting fake communication data into vehicle communication traffic on a vehicle network. In the method for preventing leakage of vehicle information, a vehicle information leakage prevention apparatus connected to an in-vehicle module analyzes a vehicle communication protocol between the module and another module. It is determined whether encryption has been applied to the vehicle communication protocol, based on results of analysis of the vehicle communication protocol. A method of generating fake communication data is selected depending on whether encryption has been applied to the vehicle communication protocol. A fake communication data is generated depending on the selected method, and the generated fake communication data is transferred to a vehicle information leakage prevention apparatus connected to the other module.

8 Claims, 4 Drawing Sheets

(51) Int. Cl.
*H04L 29/08* (2006.01)
*H04W 4/04* (2009.01)
*H04L 12/40* (2006.01)
*B60R 25/30* (2013.01)

(52) U.S. Cl.
CPC .. *H04L 2012/40273* (2013.01); *H04L 2209/84* (2013.01); *H04W 4/046* (2013.01)

(56) References Cited

U.S. PATENT DOCUMENTS

| | | | | |
|---|---|---|---|---|
| 8,132,243 | B2* | 3/2012 | Bychkov | 726/9 |
| 8,255,696 | B2* | 8/2012 | Florencio et al. | 713/184 |
| 8,898,749 | B2* | 11/2014 | Tohmo et al. | 726/5 |
| 2006/0041653 | A1 | 2/2006 | Aaron | |
| 2007/0067828 | A1* | 3/2007 | Bychkov | 726/3 |
| 2007/0250290 | A1* | 10/2007 | Kurosawa | 702/150 |
| 2009/0178144 | A1* | 7/2009 | Redlich et al. | 726/27 |
| 2009/0254572 | A1* | 10/2009 | Redlich et al. | 707/10 |
| 2010/0262835 | A1* | 10/2010 | Joffray | 713/185 |
| 2011/0010435 | A1 | 1/2011 | Okaya et al. | |
| 2011/0040944 | A1* | 2/2011 | Yamauchi et al. | 711/163 |
| 2011/0144863 | A1 | 6/2011 | Melman | |
| 2012/0185398 | A1* | 7/2012 | Weis et al. | 705/75 |
| 2014/0282978 | A1* | 9/2014 | Lerner et al. | 726/7 |

\* cited by examiner

APPARATUS AND METHOD FOR PREVENTING LEAKAGE OF VEHICLE INFORMATION

CROSS REFERENCE TO RELATED APPLICATION

This application claims the benefit of Korean Patent Application No. 10-2014-0065716, filed May 30, 2014, which is hereby incorporated by reference in its entirety into this application.

BACKGROUND OF THE INVENTION

1. Technical Field

The present invention relates generally to an apparatus and method for preventing the leakage of vehicle information and, more particularly, to an apparatus and method for preventing the leakage of vehicle information in a normal communication environment by inserting fake communication data into vehicle communication traffic on a vehicle network.

2. Description of the Related Art

Unlike in the past when Information Technology (IT) was partially limited in vehicles, a vehicle itself has now come to be configured as a single network system, that is, a vehicle network system.

In a vehicle system, communication between the external modules of a vehicle, as well as communication between the internal modules of the vehicle is performed. In this way, as the amount of communication in a vehicle has increased, vehicle communication traffic used in the vehicle has also increased. Accordingly, the amount of information that may be leaked has also increased. Therefore, separate security technology for preventing the leakage of vehicle information in a vehicle network is required.

As disclosed in Korean Patent Application Publication No. 2010-0101805 entitled "Vehicle information reading apparatus and method, vehicle information transfer apparatus and method for hacking prevention, and system using the apparatuses and methods," technology related to the hacking of vehicle communication and a vehicle control system has been recently developed. Therefore, in order to prevent hacking related to this technology, research into security using an Integrated Circuit (IC) chip, primarily led by Europe, has been conducted.

However, security research using an IC chip may prevent malfunctioning or the like in a vehicle, but it is impossible to block attacks made by monitoring vehicle communication traffic and extracting useful information without influencing the control of a vehicle. Since the fundamental idea of research using an IC chip is to prevent unauthorized commands or access, it is impossible to block simple monitoring of traffic in a vehicle network during vehicle communication.

If an attacker infects part of an in-vehicle system and then in-vehicle communication traffic is monitored and analyzed from the infected system, there is a problem in that the principal information of a specific important person ranging from the driving information of a vehicle used by the specific person to information such as frequently visited stores and life patterns of the specific person may be extracted and misused by system infection alone.

SUMMARY OF THE INVENTION

Accordingly, the present invention has been made keeping in mind the above problems occurring in the prior art, and an object of the present invention is to provide an apparatus and method that prevent the leakage of vehicle information in a normal communication environment by inserting fake communication data into the vehicle communication traffic of a vehicle network.

In accordance with an aspect of the present invention to accomplish the above object, there is provided a method for preventing leakage of vehicle information, including analyzing, by a vehicle information leakage prevention apparatus connected to an in-vehicle module, a vehicle communication protocol between the module and another module; determining whether encryption has been applied to the vehicle communication protocol, based on results of analysis of the vehicle communication protocol; selecting a method of generating fake communication data depending on whether encryption has been applied to the vehicle communication protocol; and generating fake communication data depending on the selected method, and transferring the generated fake communication data to a vehicle information leakage prevention apparatus connected to the other module.

Selecting the method may include selecting a method of inserting a basic identification value if it is determined that encryption has been applied to the vehicle communication protocol.

Selecting the method may include selecting a method of inserting a One-Time Password (OTP) if it is determined that encryption has not been applied to the vehicle communication protocol.

Transferring the generated fake communication data may include, if it is determined that encryption has not been applied to the vehicle communication protocol, inserting a normal OTP into communication data when status of communication between the modules is normal, and inserting a random OTP into the communication data when the status of communication is fake, thus generating the fake communication data.

The normal OTP and the random OTP may be provided from an OTP server.

In accordance with another aspect of the present invention to accomplish the above object, there is provided a method for preventing leakage of vehicle information, including receiving, by a vehicle information leakage prevention apparatus connected to an in-vehicle module, receiving fake communication data corresponding to the module and another module; determining status of communication between the module and the other module, using an identification value included in the fake communication data; and controlling the communication between the module and the other module, in accordance with results of determination of the communication status.

The identification value may correspond to a basic identification value used when encryption has been applied to a vehicle communication protocol, or a One-Time Password (OTP) used when encryption has not been applied to the vehicle communication protocol.

In accordance with a further aspect of the present invention to accomplish the above object, there is provided an apparatus for preventing leakage of vehicle information, including a protocol analysis unit for analyzing a vehicle communication protocol between an in-vehicle module and another module and determining whether encryption has been applied to the vehicle communication protocol, based on results of analysis; an identification value insertion unit for, if it is determined that encryption has been applied to the vehicle communication protocol, inserting a basic identification value into communication data, thus generating fake communication data; a One-Time Password (OTP) insertion unit for, if it is determined that encryption has not been applied to the vehicle communication protocol, inserting an OTP into the communication data depending on status of communication between the module and the other module, thus generating fake communication data; and a data transmission unit for transferring the fake communication data generated by the identification value insertion unit or the OTP insertion unit to a vehicle information leakage prevention apparatus connected to the other module.

The OTP insertion unit may be configured to, if the status of communication between the modules is normal, insert a normal OTP into the communication data, and if the status of communication is fake, insert a random OTP into the communication data, thus generating the fake communication data.

The OTP insertion unit may be provided with the normal OTP and the random OTP from an OTP server.

The apparatus may further include a method selection unit for selecting a method for generating fake communication data depending on whether encryption has been applied to the vehicle communication protocol.

The method selection unit may be configured to, if encryption has been applied to the vehicle communication protocol, select a method of inserting a basic identification value, and if encryption has not been applied to the vehicle communication protocol, select a method of inserting an OTP.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
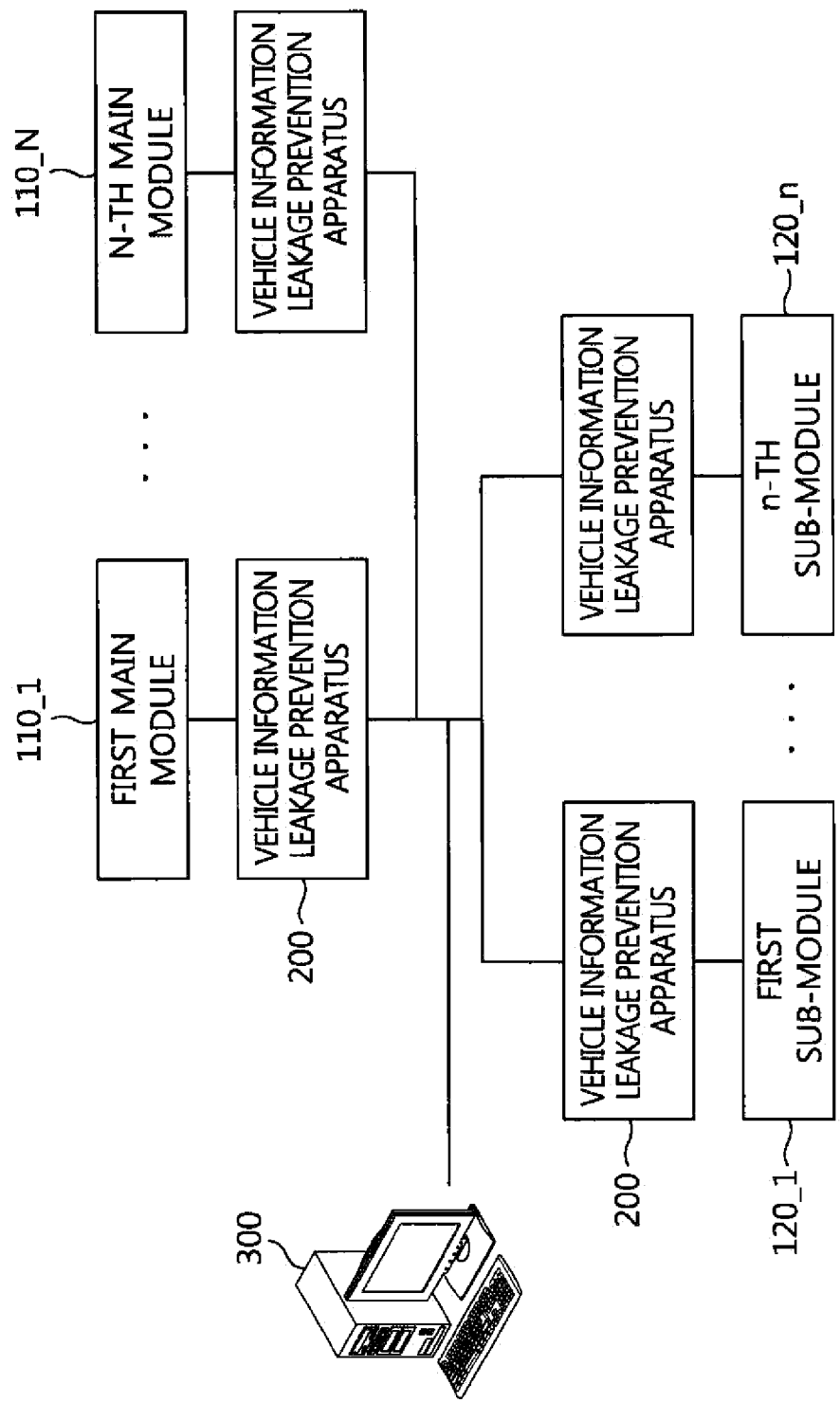
FIG. 1 is a diagram showing an environment to which an apparatus for preventing the leakage of vehicle information according to an embodiment of the present invention is applied.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, an apparatus and method for preventing the leakage of vehicle information according to embodiments of the present invention will be described in detail with reference to the attached drawings.

FIG. 1 is a diagram showing an environment to which an apparatus for preventing the leakage of vehicle information according to an embodiment of the present invention is applied.

First, vehicle communication traffic according to an embodiment of the present invention denotes information occurring in all communication performed via a vehicle communication protocol, for example, the travel information and driving information of a vehicle and the information of in-vehicle modules.

Referring to FIG. 1, the environment to which the apparatus for preventing the leakage of vehicle information according to an embodiment of the present invention is applied includes in-vehicle main modules (first main module to N-th main module) 110_1 to 110_N, sub-modules (first sub-module to n-th sub-module) 120_1 to 120_$n$, apparatuses 200 for preventing the leakage of vehicle information, which are located in the respective modules, and a One-Time Password (OTP) server 300.

The vehicle information leakage prevention apparatuses 200, which are located on the respective modules, allow fake communication data to be transmitted and received between the individual modules, and prevent an attacker from identifying normal communication, thus preventing information from being leaked through vehicle communication traffic.

A transmitting side-vehicle information leakage prevention apparatus includes a fake communication application (Fake Communication App: FCA), and transfers fake communication data to a receiving side-vehicle information leakage prevention apparatus via the FCA. In this case, the receiving side-vehicle information leakage prevention apparatus is characterized by including an FCA in the same manner as the transmitting side-vehicle information leakage prevention apparatus.

Below, the configuration of the vehicle information leakage prevention apparatus 200 will be described in detail with reference to FIGS. 2 and 3.

Figure 2:
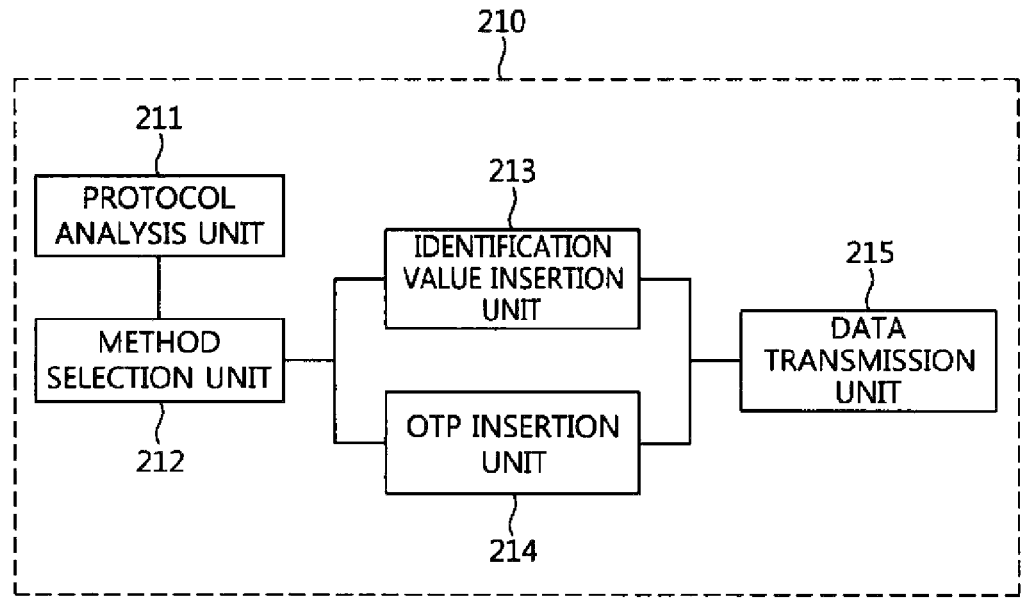
FIG. 2 is a diagram showing a vehicle information leakage prevention apparatus for generating and transmitting fake communication data according to an embodiment of the present invention.

FIG. 2 is a diagram showing the vehicle information leakage prevention apparatus for generating and transmitting fake communication data according to an embodiment of the present invention.

Referring to FIG. 2, a vehicle information leakage prevention apparatus 210 for generating and transmitting fake communication data (hereinafter referred to as a "transmitting side-vehicle information leakage prevention apparatus") includes a protocol analysis unit 211, a method selection unit 212, an identification value insertion unit 213, an OTP insertion unit 214, and a data transmission unit 215.

The protocol analysis unit 211 analyzes a vehicle communication protocol, and determines whether encryption has been applied to the vehicle communication protocol, based on the results of analysis.

The method selection unit 212 generates a method of generating fake communication data based on the results of the analysis by the protocol analysis unit 211.

In detail, if encryption has been applied to the vehicle communication protocol, the method selection unit 212 selects a method of simply inserting a basic identification value because an attacker cannot identify an encrypted vehicle communication protocol. In contrast, if encryption has not been applied to the vehicle communication protocol, the method selection unit 21 selects a method of inserting a One-Time Password (OTP).

If encryption has been applied to the vehicle communication protocol, the identification value insertion unit 213 inserts a basic identification value into communication data, and then generates fake communication data.

If encryption has not been applied to the vehicle communication protocol, the OTP insertion unit 214 is provided with an OTP from the OTP server 300 depending on the status of communication between modules, and inserts the OTP into the communication data.

In detail, if the status of communication with a module which will receive the communication data is normal, the OTP insertion unit 214 inserts a normal OTP into the communication data, whereas if the status of the communication is fake, the OTP insertion unit 214 inserts a random OTP into the communication data.

The data transmission unit 215 transfers the fake communication data generated by the identification value insertion unit 213 or the OTP insertion unit 214 to a vehicle information leakage prevention apparatus located in another module.

Figure 3:
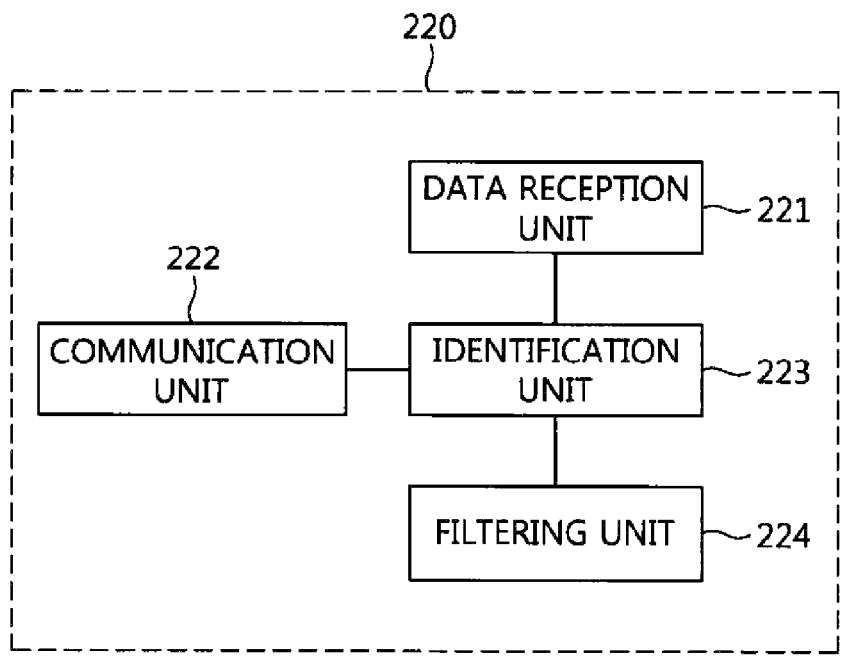
FIG. 3 is a diagram showing a vehicle information leakage prevention apparatus for receiving fake communication data according to an embodiment of the present invention.

FIG. 3 is a diagram showing a vehicle information leakage prevention apparatus for receiving fake communication data according to an embodiment of the present invention.

Referring to FIG. 3, a vehicle information leakage prevention apparatus 220 for receiving fake communication data (hereinafter referred to as a "receiving side-vehicle information leakage prevention apparatus") includes a data reception unit 221, a communication unit 222, an identification unit 223, and a filtering unit 224.

The data reception unit 221 receives fake communication data from the transmitting side-vehicle information leakage prevention apparatus 210.

The communication unit 222 receives an OTP enabling the status of communication between modules to be detected via communication with the OTP server 300.

The identification unit 223 determines whether an identification value indicative of fake communication is present in the fake communication data received by the data reception unit 221. Here, the identification value denotes a basic identification value used in a case where encryption is applied to a vehicle communication protocol, or a random OTP used in a case where encryption is not applied to the vehicle communication protocol.

The filtering unit 224 filters the corresponding vehicle communication traffic if the identification value is present in the data, received by the data reception unit 221, as a result of the identification by the identification unit 223.

In this way, fake communication is performed only by a vehicle intended to be provided with a fake communication service, that is, a vehicle information leakage prevention apparatus including a Fake Communication App (FCA).

Below, a method of preventing the leakage of vehicle information by transmitting fake communication data will be described in detail with reference to FIG. 4.

Figure 4:
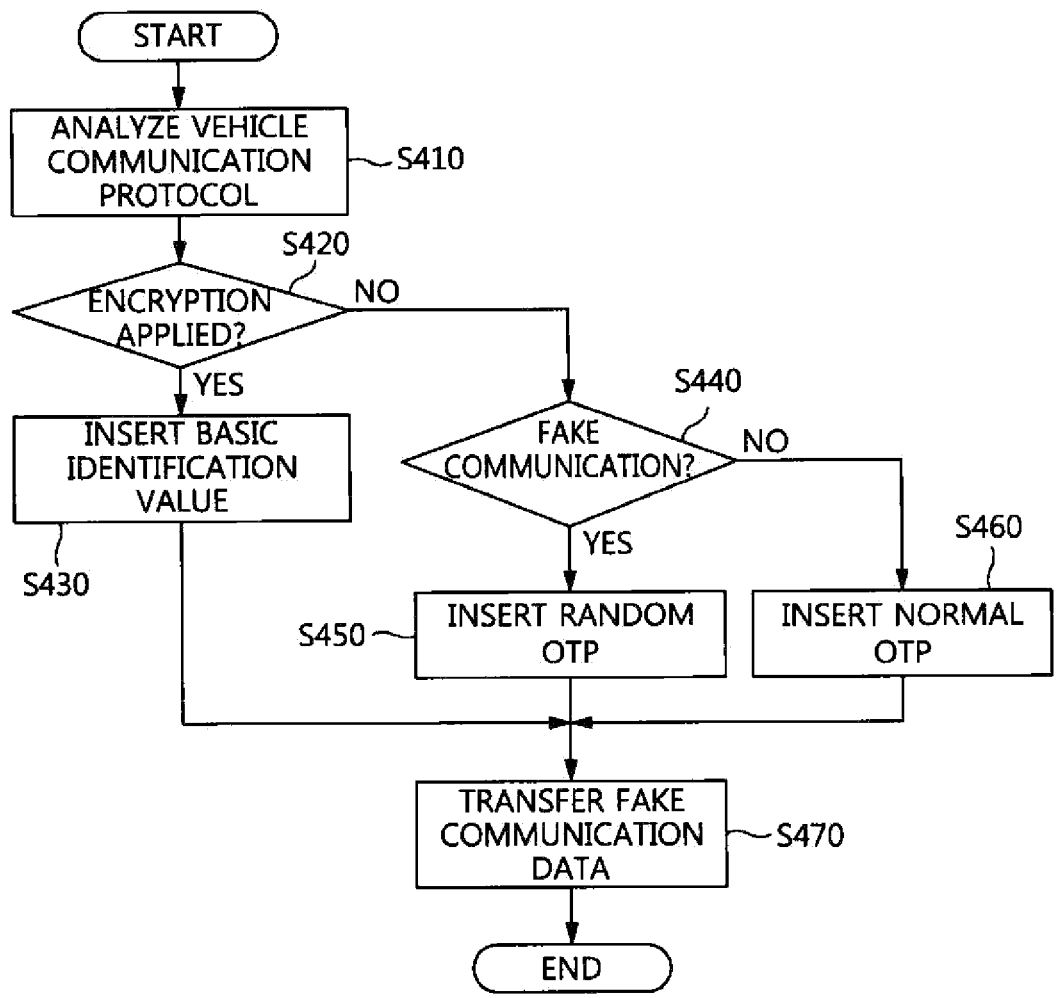
FIG. 4 is a flowchart showing a method of preventing the leakage of vehicle information by transmitting fake communication data according to an embodiment of the present invention.

FIG. 4 is a flowchart showing a method of preventing the leakage of vehicle information by transmitting fake communication data according to an embodiment of the present invention.

Referring to FIG. 4, a transmitting side-vehicle information leakage prevention apparatus 210 analyzes a vehicle communication protocol with another module that communicates with the module corresponding to the apparatus 210 at step S410.

The transmitting side-vehicle information leakage prevention apparatus 210 determines whether encryption has been applied to the vehicle communication protocol, based on the results of analysis of the vehicle communication protocol at step S410, at step S420.

If it is determined that encryption has been applied to the vehicle communication protocol, the transmitting side-vehicle information leakage prevention apparatus 210 generates fake communication data by inserting a basic identification value into communication data at step S430.

If it is determined that encryption has not been applied to the vehicle communication protocol, the transmitting side-vehicle information leakage prevention apparatus 210 determines whether the status of communication with a module which will receive the communication data is fake at step S440.

If it is determined that the status of communication with the module which will receive the communication data is fake, the transmitting side-vehicle information leakage prevention apparatus 210 generates fake communication data by inserting a random OTP into the communication data at step S450.

If it is determined that the status of communication with the module which will receive the communication data is normal, the transmitting side-vehicle information leakage prevention apparatus 210 generates fake communication data by inserting a normal OTP into the communication data at step S460.

The transmitting side-vehicle information leakage prevention apparatus 210 transfers the fake communication data generated at any one of steps S450 and S460 to a vehicle information leakage prevention apparatus located in another module at step S470.

Below, a method of preventing the leakage of vehicle information by receiving fake communication data will be described in detail with reference to FIG. 5.

Figure 5:
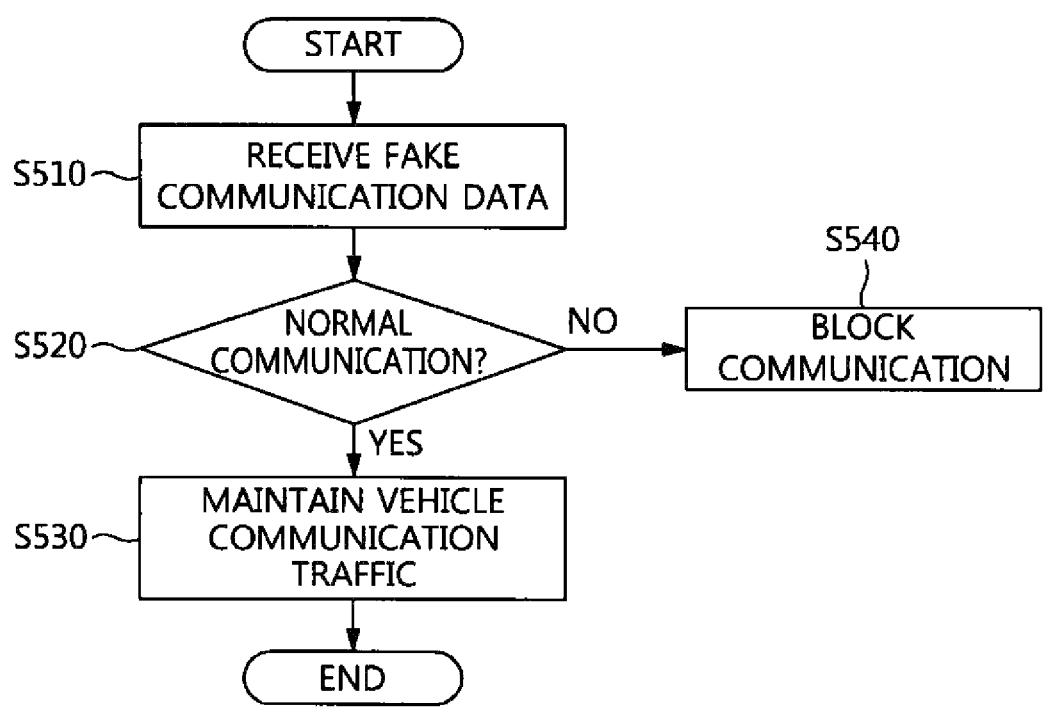
FIG. 5 is a flowchart showing a method of preventing the leakage of vehicle information by receiving fake communication data according to an embodiment of the present invention.

FIG. 5 is a flowchart showing a method of preventing the leakage of vehicle information by receiving fake communication data according to an embodiment of the present invention.

Referring to FIG. 5, the vehicle information leakage prevention apparatus 220 receives fake communication data from a vehicle information leakage prevention apparatus 210 located in another module at step S510.

The vehicle information leakage prevention apparatus 220 determines whether an identification value is present in the received fake communication data, and if the identification value is present, determines whether the status of communication between the module corresponding to the apparatus 220 and the other module is normal, using the identification value, at step S520. Here, the identification value is a basic identification value used in a case where encryption is applied to the vehicle communication protocol, or a random OTP used in a case where encryption is not applied to the vehicle communication protocol.

If the status of communication between the modules is normal, the vehicle information leakage prevention apparatus 220 maintains vehicle communication traffic without change at step S530.

If the status of communication between the modules is not normal, the vehicle information leakage prevention apparatus 220 blocks communication between the corresponding module and the other module at step S540.

In this way, the vehicle information leakage prevention apparatus may prevent vehicle information from being leaked by an attacker during vehicle communication by utilizing fake communication data. Therefore, even if a line between modules, a specific sub-module or a specific main module is infected by an attacker, and traffic is monitored, actual communication content of another module that is not infected cannot be known, so that the attacker cannot distinguish the content of actual communication received from the other module from the content of fake communication, thus preventing information from being extracted via the monitoring of traffic.

In accordance with the present invention, the apparatus and method for preventing the leakage of vehicle information are advantageous in that, even if vehicle communication traffic is monitored by an attacker, vehicle information or travel information may be prevented from being extracted by the attacker from the vehicle communication traffic.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A method for preventing leakage of vehicle information, comprising:
    analyzing, by a vehicle information leakage prevention apparatus connected to an in-vehicle module, a vehicle communication protocol between the module and another module;
    determining whether encryption has been applied to the vehicle communication protocol, based on results of analysis of the vehicle communication protocol;
    selecting a method of generating fake communication data depending on whether encryption has been applied to the vehicle communication protocol; and
    generating fake communication data depending on the selected method, and transferring the generated fake communication data to a vehicle information leakage prevention apparatus connected to the other module,
    wherein transferring the generated fake communication data comprises, if it is determined that encryption has not been applied to the vehicle communication protocol, inserting a normal OTP into communication data when status of communication between the modules is normal, and inserting a random OTP into the communication data when the status of communication is fake, thus generating the fake communication data.

2. The method of claim 1, wherein selecting the method comprises selecting a method of inserting a basic identification value if it is determined that encryption has been applied to the vehicle communication protocol.

3. The method of claim 1, wherein selecting the method comprises selecting a method of inserting a One-Time Password (OTP) if it is determined that encryption has not been applied to the vehicle communication protocol.

4. The method of claim 1, wherein the normal OTP and the random OTP are provided from an OTP server.

5. An apparatus for preventing leakage of vehicle information, comprising:
    a protocol analysis unit for analyzing a vehicle communication protocol between an in-vehicle module and another module and determining whether encryption has been applied to the vehicle communication protocol, based on results of analysis;
    an identification value insertion unit for, if it is determined that encryption has been applied to the vehicle communication protocol, inserting a basic identification value into communication data, thus generating fake communication data;
    a One-Time Password (OTP) insertion unit for, if it is determined that encryption has not been applied to the vehicle communication protocol, inserting an OTP into the communication data depending on status of communication between the module and the other module, thus generating fake communication data; and
    a data transmission unit for transferring the fake communication data generated by the identification value insertion unit or the OTP insertion unit to a vehicle information leakage prevention apparatus connected to the other module,
    wherein the OTP insertion unit is configured to, if the status of communication between the modules is normal, insert a normal OTP into the communication data, and if the status of communication is fake, insert a random OTP into the communication data, thus generating the fake communication data.

6. The apparatus of claim 5, wherein the OTP insertion unit is provided with the normal OTP and the random OTP from an OTP server.

7. The apparatus of claim 5, further comprising a method selection unit for selecting a method for generating fake communication data depending on whether encryption has been applied to the vehicle communication protocol.

8. The apparatus of claim 7, wherein the method selection unit is configured to, if encryption has been applied to the vehicle communication protocol, select a method of inserting a basic identification value, and if encryption has not been applied to the vehicle communication protocol, select a method of inserting an OTP.

* * * * *